United States Patent [19]
Friedl et al.

[11] 3,989,029
[45] Nov. 2, 1976

[54] LIQUID FUEL BURNING HEATER FOR VEHICLES

[75] Inventors: Reiner Friedl, Starnberg; Karl Dworschak, Munich; Werner Hornfeck, Unterpfaffenhofen, all of Germany

[73] Assignee: Webasto-werk W. Baier KG, Stockdorf near Munich, Germany

[22] Filed: Dec. 11, 1974

[21] Appl. No.: 531,788

[30] Foreign Application Priority Data
July 9, 1974 Germany.............................. 2432850
Dec. 11, 1973 Austria .............................. 10333/73

[52] U.S. Cl. .......................... 126/110 B; 126/116 R
[51] Int. Cl.[2] .......................................... F24H 3/06
[58] Field of Search ........ 126/110 R, 110 B, 110 C, 126/116 R

[56] References Cited
UNITED STATES PATENTS
2,757,662  8/1956  Baier et al...................... 126/110 R
2,775,293  12/1956  Raymond et al................ 126/110 R
3,894,526  7/1975  Kofink ............................ 126/116 R FOREIGN PATENTS OR APPLICATIONS
1,373,871  8/1964  France ............................ 126/110 R
1,354,294  1/1964  France ............................ 126/110 R Primary Examiner—Carroll B. Dority, Jr.
Attorney, Agent, or Firm—Otto John Munz

[57] ABSTRACT

A liquid fuel burning heater for vehicles in which the burner unit has a housing which is surrounded by a radially spaced casing, and the heat exchanger has spaced inner and outer jackets axially aligned with the housing and casing, so that the air flows between them past the latter into the former. The casing and at least the outer jacket of the heat exchanger are integral parts of a unitary casting; the burner unit may be a self-contained subassembly, pre-assembled in its housing.

12 Claims, 4 Drawing Figures

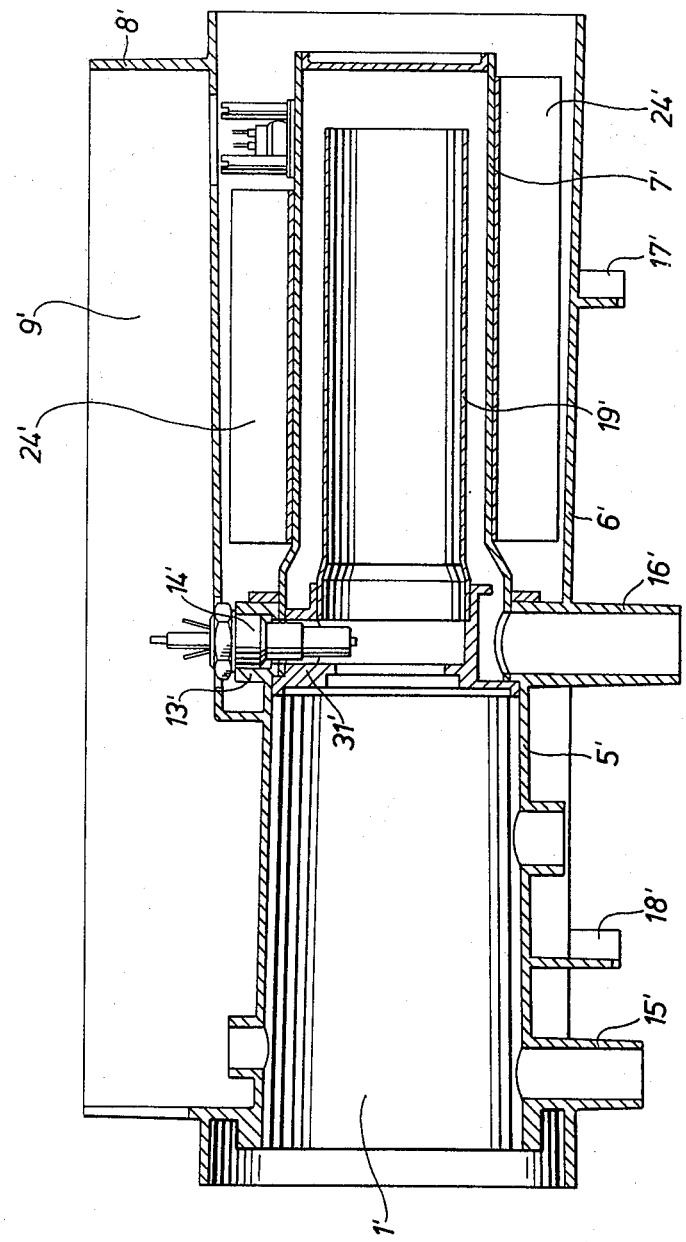

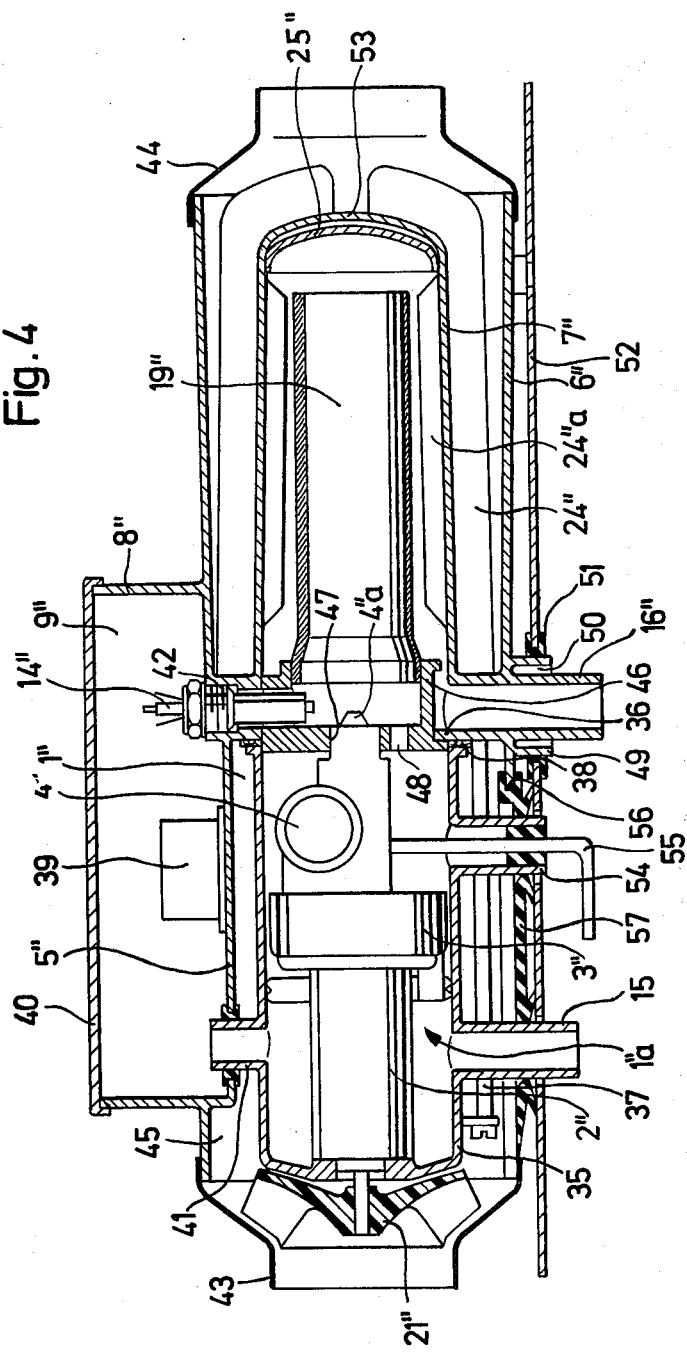

LIQUID FUEL BURNING HEATER FOR VEHICLES

BACKGROUND OF THE INVENTION

1. Field of the Invention

The present invention relates to liquid fuel burning heaters, and more especially to compact, self-contained heater units suitable for use in vehicles, units that comprise a liquid fuel fed burner and a heat exchanger arranged in axial alignment inside a housing.

2. Description of the Prior Art

Various attempts have been made in the past to provide the heat exchanger part of heaters of the above-mentioned type in the form of a casting, considerable production economies being realizable, especially when the inner jacket which carries a number of radial fins is cast. It has also already been suggested to combine the burner housing with the finned inner jacket of the heat exchanger as a unitary casting, the jacket forming an axial extension of the burner housing. This simple structure has proved to be especially advantageous in the case of large production quantities, even though the initial assembly and any disassembly for servicing involve comparatively complicated procedures. Another shortcoming of this type of apparatus has to do with the susceptibility of the heat exchanger to premature destruction under heavy heat load, inspite of the general use of steel liners inside the inner jackets. Lastly, it has heretofore still been impossible to apply this type of structure to very compact heater units, where it is important to operate under comparatively high heating capacities, with correspondingly high specific heat loads on the heat exchanger walls.

SUMMARY OF THE INVENTION

Underlying the present invention is the primary objective of providing an improved heater of the above type, where the assembly operation is greatly simplified and production costs are reduced accordingly. Further, the improved apparatus is to be suitable for high heat output.

The present invention proposes to attain the above objective by suggesting a liquid fuel burning heater in which the outer jacket of the heat exchanger and the casing for the burner unit are combined in the form of a unitary casting. This novel design not only permits the elimination of a number of manufacturing operations relating to the need for several openings in the outer jacket of the heat exchanger, it also provides a number of additional simplifications in terms of production and assembly, so as to give the heater apparatus exceptional structural stability while reducing production costs.

The invention suggests, for instance, that the casting which forms the casing surrounding the burner unit and which also includes the outer jacket of the heat exchanger be provided with a lateral head, the latter enclosing a space for the accommodation of the controls and of the ignition plug for the burner unit, a suitable cover protecting these devices. The space inside the lateral head may be arranged to communicate with that portion of the housing through which the combustion air is advanced toward the burner head, thereby automatically returning to the burner the exhaust gases that might have leaked along the ignition plug from the combustion chamber into the cavity of the lateral head.

The inner jacket of the heat exchanger may be provided as a separate part, preferably capable of being mounted by inserting it through the open end of the casting which is opposite the burner casing. The jacket is thus quickly and easily removable and replaceable, should high heat load have led to destruction of the former.

A still further simplification of the manufacturing operation is available, when not only the outer jacket of the heat exchanger and the casing for the burner unit are unitary, in design, but when the inner jacket with its fins is likewise an integral unitary part of the main casting. In this embodiment, the entire housing, including the burner casing and the entire heat exchanger, is a light metal alloy casting with conveniently located axial extensions for the connection of intake and outlet hoods and/or air ducts.

The inner and outer jackets of the heat exchanger may be connected to each other via several of the fins, preferably, however, only at localized places, in order to minimize direct heat transfer from the inner to the outer jacket. These localized connecting points are preferably arranged near the burner end of the heat exchanger.

The present invention further affords a simple way of minimizing any heat transfer from the heat exchanger to the burner unit while also simplifying the design and assembly of that unit. For this purpose, the burner unit is provided as a complete, pre-assembled unit with a separate burner housing which can be mounted on the heater by simply sliding it axially into the burner lodgement, the burner housing being clampable to a mounting flange on the open end of the inner jacket. This separate housing for the burner unit provides a convenient annular gap between it and the lodgement casing, through which the air to be heated flows past the burner unit into the heat exchanger unit, between the inner and outer jackets of the latter.

The aforementioned structural arrangement of the burner unit makes it possible to separately assemble the latter and to conveniently test each unit, before it is mounted inside the heater lodgement. A simple insulating gasket between the mounting flange of the inner jacket and the burner housing will further reduce heat transfer from the heat exchanger to the burner unit, while the incoming air that passes along the outer wall of the burner housing continuously cools the latter.

At the open end of the inner jacket of the heat exchanger may further be provided a mounting flange having a simple aperture for the atomizer of the burner unit, in addition to air passages for the flow of combustion air into the combustion tube. The latter is likewise preferably attached to the mounting flange.

The unitary heater casting as suggested by the present invention further preferably includes an integral exhaust duct which radially traverses the inner and outer jackets of the heat exchanger. In cases where the heater is mounted in such a way that the exhaust duct leads through a floor panel or the like, it is further suggested to arrange around the duct a concentric cylindrical collar which engages a suitable rubber gasket in the floor panel, thereby providing an annular gap between the exhaust duct and the panel, in order to minimize overheating of the latter. Obviously, the integral structure of the heater housing and of the exhaust duct makes such an arrangement simple and inexpensive.

In order to prevent overheating of the closed end of the inner jacket of the heat exchanger, against which the hot combustion gases are deflected, it is advisable to provide in this area a heat shield in the form of a heat resistant liner, preferably a steel liner.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 3 shows in longitudinal cross section a modified main heater housing, so arranged that the inner jacket of the heat exchanger and the combustion tube are parts that are manufactured separately and mounted in the housing; and FIG. 4 compares to FIG. 1, showing a further embodiment of the invention where the burner unit is assembled inside a removable burner housing.

DESCRIPTION OF THE PREFERRED EMBODIMENTS

Figure 1:
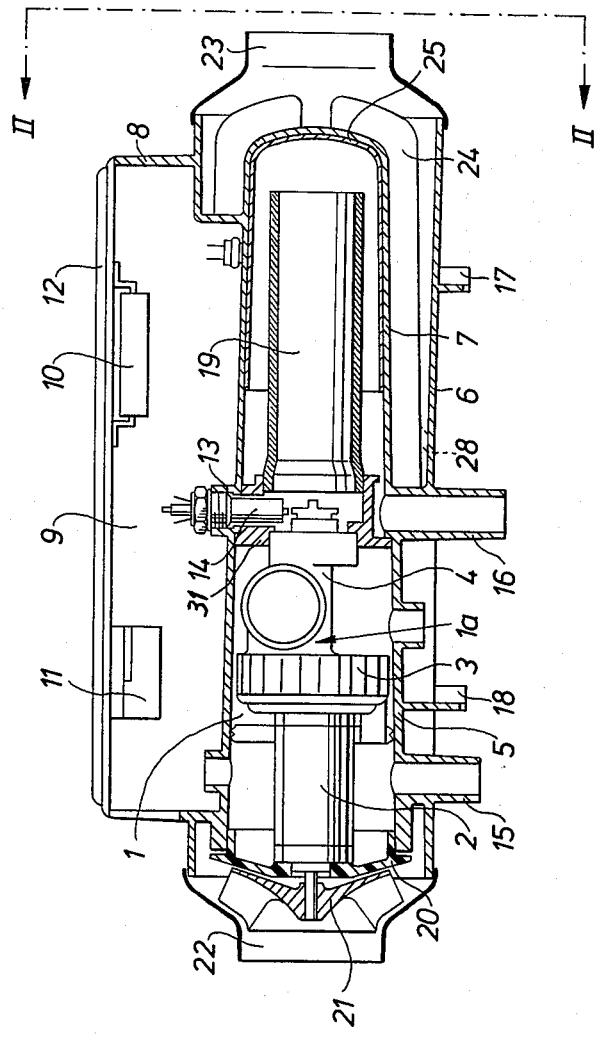
FIG. 1 illustrates, in a longitudinal cross section, a heater embodying the present invention, the inner and outer jackets of the heat exchanger being integral parts of a unitary heater housing.
Figure 2:
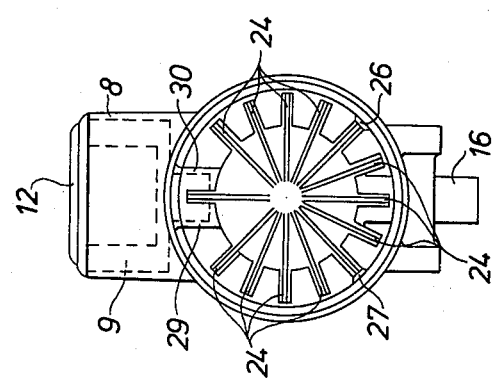
FIG. 2 is an end view of the heater of FIG. 1, as seen in the direction of the arrows II, with the air outlet hood removed.

In FIG. 1 is shown a liquid fuel burning heater for vehicles designed for the heating of a flow of air through the transfer of combustion heat to the air in a heat exchanger. On the left-hand side of the heater can be seen a burner unit 1a arranged inside a burner lodgement 1. The burner unit consists of an electrical motor 2, a combustion air blower 3, and a fuel feed device 4. The casing 5 defining the burner lodgement 1 is seen to be part of a unitary casting or main housing which also includes, on the right-hand side of the heater, the outer jacket 6 and the inner jacket 7 of the heat exchanger unit. FIG. 2, in conjunction with FIG. 1, shows that this casting includes a lateral head 8 inside which is provided a cavity or head space 9, for the accommodation of various heater controls. Of the latter, only a resistor 10 and an ignition coil 11 are schematically shown in FIG. 1. A cover 12 provides a closure for the head space 9 to protect the heater controls.

An eye extension 13 of the unitary casting reaches upwardly into the head space 9, accommodating therein a conveniently accessible ignition plug 14.

On the left-hand side of the casing 5 for the burner unit is arranged an intake duct 15 for the combustion air, and approximately opposite the eye extension 13 is arranged an exhaust duct 16 through which the hot combustion exhaust leaves the combustion chamber. Also on the lower side of the casting are provided appropriate leg extensions 17 and 18 supporting the heater against a suitable floor panel or other mounting surface. The latter will have to have appropriate apertures for accommodating therein the earlier-mentioned intake and exhaust ducts 15 and 16.

Inside the closed right-hand portion of the casting, which latter serves as the inner jacket 7 of the heat exchanger, is preferably mounted a combustion tube 19 which, together with its mounting flange 31, is conveniently insertable through the larger open left-hand side of the casting.

The burner lodgement 1 is closable by means of an end cover 20, serving as a support flange for the electric motor 2, an impellor 21 being mounted on the motor shaft outside the end cover 20. The impellor 21, in conjunction with a matching removable intake hood 22, constitutes a blower unit that draws cold air into the main housing, moving it axially past the casing 5 of the burner unit, and through the heat exchanger. The heated air leaves the heat exchanger in the axial direction, via an outlet hood 23 which is similar to the intake hood 22.

Inside the inner jacket 7 of the heat exchanger is further arranged a heat resistant steel liner 25, designed to protect the casting of light metal alloy from overheating. As FIG. 2 shows, the inner jacket 7 carries a series of radial, axially extending fins 24 through which heat is transferred to the passing air flow. These fins 24, however, preferably do not extend all the way to the outer jacket 6, but stop short of the latter, in order to minimize direct heat transfer from the inner jacket 7 to the outer jacket 6. Only two localized supporting webs 26 and 27 provide the necessary stability between the inner and outer jackets. These supporting webs are preferably arranged near the burner-side of the heat exchanger, where they are indicated schematically at 28 of FIG. 1. However, since the exhaust duct 16 already provides a link between the inner and outer jackets, the bottom fin (the one shown in FIG. 1) is preferably free of such a supporting web. On the upper side of the casting, the connection between the inner and outer jackets is established through the longitudinal wall portions 29 and 30 (FIG. 2) of the lateral head 8 which separate the head space 9 for the heater controls from the flow space of the heat exchanger.

In FIG. 3 is shown a modified casting for an otherwise similar heater unit, equivalent parts being designated by the same reference numerals followed by a "prime." In this instance, the inner jacket 7' of the heat exchanger is no longer integrally cast with the outer jacket 6' and the burner casing 5', but is manufactured as a separate, more heat resistant part, to be mounted inside the outer jacket 6' in conjunction wit the combustion tube 19' and its mounting flange 31'.

The embodiment of FIG. 4 represents again a generally similar heater having an integrally cast main housing that comprises the burner casing and the two heat exchanger jackets. Here again, similar parts are referred to with corresponding reference numerals followed by a "double prime."

As in the first-described embodiment, the heater casting comprises a casing 5'' for the burner and both an outer jacket 6'' and an inner jacket 7'' for the heat exchanger. The inner jacket 7'' has in this case both outer fins 24'' and inner fins 24''a. The casing 5'', forming in general an axial extension of the outer jacket 6'', defines a burner lodgement 1'' for the accommodation of a burner unit 1''a. The latter consists essentially of an electric motor 2'', a combustion air blower 3'', and a fuel feed device 4'' with an atomizer nozzle 4''a. The entire burner unit 1''a is arranged inside a burner housing 35 and, by virtue of this arrangement, can be completely pre-assembled prior to insertion into the heater. Thus, the housing 35, containing the complete burner unit 1''a, is arranged to be inserted axially into the casing 5''', using a tilting motion for the insertion of its upper duct extension 41 into an appropriate aperture of the casing 5''. The inserted housing 35 bears axially against a mounting face 36 of the inner jacket 7'', being held in place by means of several long bolts 37. Between the mounting face 36 of the inner jacket 7″ and the burner housing 5 is preferably further arranged an insulating gasket 38, for the purpose of minimizing any heat transfer to the burner unit.

The main casting of the heater thus comprises the inner jacket 7″ with its inner and outer fins and the outer jacket 6″ defining an annular air flow space with the latter, and the casing 5″ defining the lodgement 1″ for the burner unit 1″a and its housing 35, the annular air flow space continuing therebetween. This unitary main housing is preferably a light metal alloy casting. It further includes, as in the earlier embodiments, a lateral head 8″ enclosing inside its cavity 9″ suitable heater controls 39, including an ignition plug 14″. A cover 40 closes the head space 9″ against the outside. Into this closed head space leads the duct extension 41 which thus links the inside of the burner housing 35 with the head space 9″. This connection serves the purpose of evacuating any exhaust gas that might leak from the combustion tube 19″ to the head space 9″, via the ignition plug seat 42, the leaked gas being thus sucked into the housing 35 and rejoined to the combustion air through the action of the combustion air blower 3″.

The axial ends of the casting serve again as the intake and outlet openings for the air to be heated, the intake side accommodating an impellor 21″ covered by an intake hood 43, a similar outlet hood 44 being mounted on the outside of the heater. The incoming cold air, passing through the impellor 21″, is pushed axially through the annular air flow space 45 between the burner housing 35 and the surrounding casing 5″, from where it passes into the heat exchanger portion between the outer jacket 6″ and the inner jacket 7″, flowing alongside the fins 24″ and 24″a of the latter. The incoming cold air, by passing over the burner housing 35, thus provides additional cooling for the burner unit 1″a. The combustion tube 19″ is again supported by means of a mounting flange 46, the latter having an aperture for the positioning of the atomizer nozzle 4″a, as well as additional air passages 48 for the entry of combustion air into the combustion chamber. The embodiment of FIG. 4 thus makes it possible to insert and remove the entire burner unit, pre-assembled inside its housing 35, into and from the burner lodgement 1″ inside the casing 5″.

On the lower side of the main casting is again arranged an exhaust duct 16″ which radially traverses the air flow space of the heat exchanger. In this case, however, the exhaust duct 16″ is surrounded by a cylindrical collar 49 which defines an annular gap 50 between it and the duct 16″, thereby reducing the transfer of heat from the exhaust duct to a floor panel 52 inside which the exhaust duct is positioned by means of a rubber gasket 51 surrounding the collar 49. The closed end portion 53 of the inner jacket 7″ is again shielded against excessive heat buildup by means of a steel liner 25″, arranged at an axial gap from the end portion 53.

The housing 35 of the burner unit 1″a is preferably likewise manufactured as a light metal alloy casting, with the earlier-mentioned duct extension 41 and an opposing intake duct 15″ for the combustion air, as well as a third eye extension 54 for the fuel line 55, as integral wall portions thereof. The insertion of this housing, with its extensions, thus requires the provision of a longitudinal slot 56 in the bottom portion of the casing 5″, the slot 56 being sealed shut by means of a rubber closure 57, once the burner unit is bolted in place.

Three different versions of the proposed unitary main housing have been described in detail hereinabove. In summary, the cast housing may constitute, as integral portions thereof, (a) the casing and burner housing, as well as the inner and outer heater exchanger jackets (FIG. 1); (b) the casing and burner housing, as well as the outer heat exchanger jacket (FIG. 3); and (c) the casing and the inner and outer heat exchanger jackets. A fourth version is possible, viz. (d) the casing and the outer heat exchanger jacket integrally cast, with the burner housing and the inner heat exchanger jacket removable. This structure is readily derivable from FIG. 4 and FIG. 3, respectively.

It should be understood, of course, that the foregoing disclosure describes only preferred embodiments of the invention and that it is intended to cover all changes and modifications of these examples of the invention which fall within the scope of the appended claims.

We claim the following:

1. A liquid fuel burning heater, particularly suited for use in vehicles, the device comprising in combination:

a burner unit, including a burner head, a combustion air blower, means for feeding fuel to the burner head, and means for igniting the latter;

an elongated combustion chamber defined generally by a combustion tube into which the combusting air and fuel are discharged, the burner unit and the combustion chamber thus defining a longitudinal axis of the heater;

a heat exchanger chamber surrounding the combustion chamber substantially concentrically, the heat exchanger chamber being defined by an inner jacket surrounding the combustion tube with an annular gas flow space therebetween and an outer jacket surrounding said inner jacket with an air flow space therebetween; the inner jacket having a closed end portion surrounding one end of the combustion tube, so as to deflect the combusted gases exiting therefrom into said gas flow space, and an exhaust duct communicating with said space near the opposite end of the inner jacket;

a burner housing surrounding the burner unit, said housing being generally axially aligned with and connected to the inner jacket of the heat exchanger; and a casing defining a lodgement for the burner unit by surrounding the burner housing with an air flow space therebetween the casing and the air flow space being similarly axially connected to the outer jacket of the heat exchanger and its air flow space; and wherein:

the outer jacket of the heat exchanger and said casing are integrally constituted by a unitary casting of generally tubular configuration, the casting including in its midportion a tubular radial extension serving as said exhaust duct;

a lateral head extending from said outer jacket and said casting so as to reach at least partially over both; said lateral head defining a head space for the accommodation of heater controls, having substantially parallel walls that are likewise integrally constituted by said unitary casting;

a cover closing said head space against the outside; and an air connection leading to the intake side of the combustion air blower for the evacuation of leaked combustion gases from said head space.

2. A device as defined in claim 1, wherein:

the inner jacket of the heat exchanger includes a number of radial longitudinal fins on at least the outer side of its wall;

the outer jacket, as constituted by said casting, has an axial opening for the insertion therethrough of the inner jacket; and the casting and the inner jacket together define means for mounting the latter inside the former.

3. A device as defined in claim 2, wherein:

said casting is a light metal alloy casting;

said inner jacket is a removable steel element having a higher heat resistance than the casting; and said combustion tube is likewise a removable element, including a steel tube and a mounting flange attached thereto, the latter connecting the combustion tube to the casting.

4. A device as defined in claim 1, wherein said inner jacket of the heat exchanger is likewise integrally constituted by said unitary casting and includes a number of radial longitudinal fins extending into the air flow space between said integrally cast inner and outer jackets.

5. A device as defined in claim 4, wherein at least some of said fins of the inner jacket are integrally connected to said outer jacket, thereby stabilizing the two heat exchanger jackets against each other.

6. A device as defined in claim 5, wherein the connections between the inner and outer heat exchanger jackets are restricted to a location near the heat exchanger end portion that adjoins the burner unit.

7. A device as defined in claim 4, wherein the inner jacket of the heat exchanger includes a liner of steel placed on the inside of its closed end portion for the protection of the jacket against overheating.

8. A device as defined in claim 1, wherein:

the burner housing is likewise integrally constituted by said unitary casting, which latter further includes:

a radial tubular duct extension for the intake of combustion air into the burner housing;

a radial tubular duct extension for the outlet of combustion exhaust from said gas flow space inside the inner jacket; and a generally radially oriented extension reaching into said lateral head and serving as a seat for an ignition plug.

9. A device as defined in claim 1, wherein:

The burner unit and the burner housing form a self-contained subassembly that is insertable into and removable from the surrounding casing; and the device further comprises an inner mounting face in the vicinity of the junction of the casing and heat exchanger, against which said subassembly is clampable; and said subassembly further includes means for insulating it against heat convection from the heat exchanger, via said mounting face.

10. A device as defined in claim 9, further comprising:

a central mounting flange positioned near the junction of the casing and heat exchanger, said mounting face being defined by the mounting flange; and wherein the combustion tube is attached to and supported by the mounting flange; and the mounting flange further has a central opening for the burner head of the burner unit.

11. A device as defined in claim 1, wherein the unitary casting further includes leg extensions for supporting the heater against a support panel.

12. A liquid fuel burning heater, particularly suited for use in vehicles, the device comprising in combination:

a burner unit, including a burner head, a combustion air blower, means for feeding fuel to the burner head, and means for igniting the latter;

an elongated combustion chamber defined generally by a combustion tube into which the combusting air and fuel are discharged, the burner unit and the combustion chamber thus defining a longitudinal axis of the heater;

a heat exchanger chamber surrounding the combustion chamber substantially concentrically, the heat exchanger chamber being defined by an inner jacket surrounding the combustion tube with an annular gas flow space therebetween and an outer jacket surrounding said inner jacket with an air flow space therebetween; the inner jacket having a closed end portion surrounding one end of the combustion tube, so as to deflect the combusted gases exiting therefrom into said gas flow space, and an exhaust duct communicating with said space near the opposite end of the inner jacket;

a burner housing surrounding the burner unit, said housing being generally axially aligned with and connected to the inner jacket of the heat exchanger; and a casing defining a lodgement for the burner unit by surrounding the burner housing with an air flow space therebetween the casing and the air flow space being similarly axially connected to the outer jacket of the heat exchanger and its air flow space; and wherein:

the outer jacket of the heat exchanger and said casing are integrally constituted by a unitary casting of generally tubular configuration, the casting including in its midportion a tubular radial extension serving as said exhaust duct;

a radial exhaust duct extension for the outlet of combustion exhaust from said gas flow space inside the inner jacket; and a generally cylindrical collar surrounding said exhaust duct with an annular air gap therebetween, the collar being arranged radially outside the heat exchanger and adapted for engagement with an aperture of a mounting panel.

* * * * *